United States Patent [19]

Linder et al.

[11] 4,212,342
[45] Jul. 15, 1980

[54] METHOD AND APPARATUS FOR REGULATING THE BATH LEVEL OF A CONTINUOUS CASTING MOLD

[75] Inventors: Sten Linder, Tystberga; Johan Spijkerman, Nyköping, both of Sweden

[73] Assignee: Concast AG, Zurich, Switzerland

[21] Appl. No.: 940,622

[22] Filed: Sep. 8, 1978

[30] Foreign Application Priority Data

Sep. 19, 1977 [CH] Switzerland ............ 11398/77

[51] Int. Cl.² .............................................. B22D 11/16
[52] U.S. Cl. ........................................... 164/4; 164/413; 164/449; 324/204; 324/228
[58] Field of Search .................. 164/4, 150, 154, 155, 164/449, 413; 324/204, 236, 228

[56] References Cited

U.S. PATENT DOCUMENTS

| | | | |
|---|---|---|---|
| 3,519,060 | 7/1970 | Vischulis | 164/449 |
| 3,670,801 | 6/1972 | Crowell et al. | 164/154 |
| 3,723,862 | 3/1973 | Wentzel et al. | 324/236 |
| 3,942,105 | 3/1976 | Bondarenko et al. | 164/154 X |
| 4,027,233 | 5/1977 | Shmakov et al. | 164/4 X |

FOREIGN PATENT DOCUMENTS 44-26641 11/1969 Japan ........................... 164/155

Primary Examiner—Robert D. Baldwin
Assistant Examiner—J. Reed Batten, Jr.
Attorney, Agent, or Firm—Werner W. Kleeman

[57] ABSTRACT

A method of, and apparatus for, regulating the bath level of a continuous casting mold by means of electromagnetic alternating fields which contemplates measuring changes in the inductance as a function of the bath level and employing such measured changes as an input signal for bath level regulation. According to specific aspects of the invention an electromagnetic primary alternating field is directed at one mold wall from the side of the continuous casting mold where the molten metal is poured-in. This alternating field induces a current in the mold wall and a secondary electromagnetic alternating field produced by such current is measured and employed as an input signal for regulation of the bath level in the continuous casting mold.

15 Claims, 10 Drawing Figures

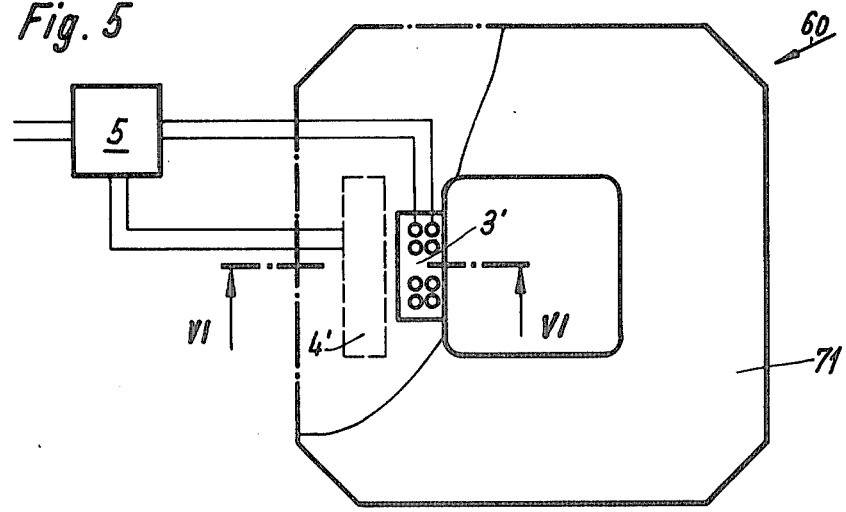
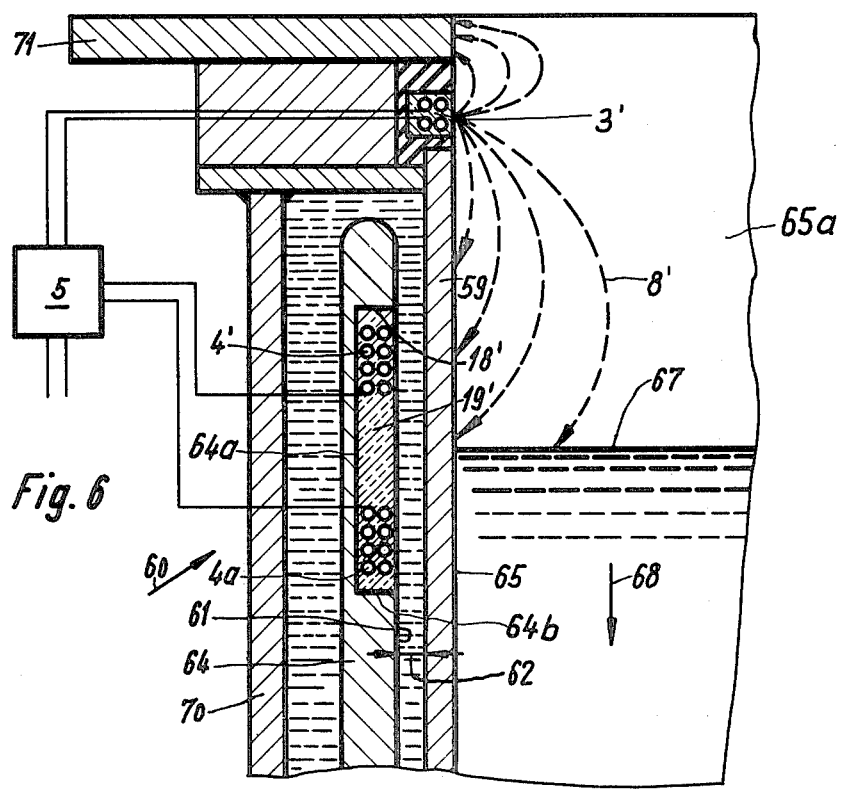

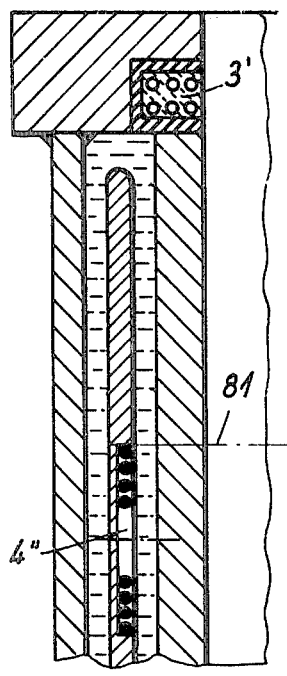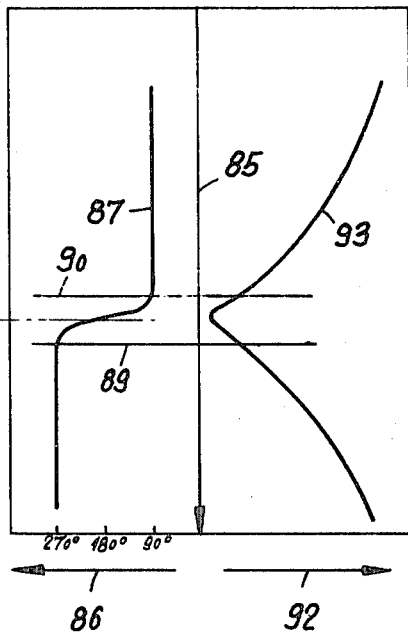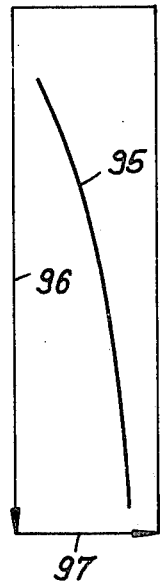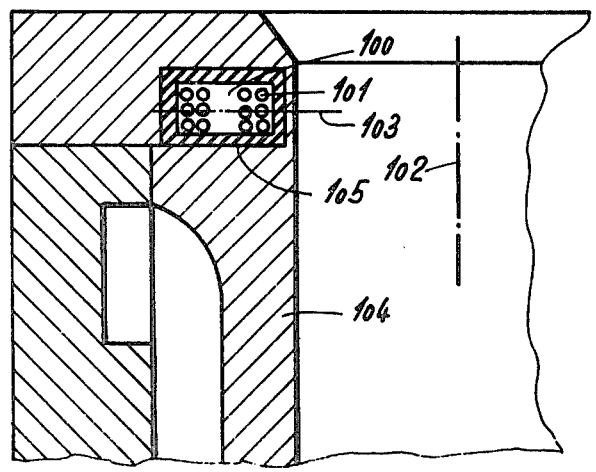

METHOD AND APPARATUS FOR REGULATING THE BATH LEVEL OF A CONTINUOUS CASTING MOLD

BACKGROUND OF THE INVENTION

The present invention relates to a new and improved method of regulating the bath level of a continuous casting mold by means of electromagnetic alternating fields, wherein there are measured changes of the inductance as a function of the bath level which are used as input signals for regulation of the bath level. The invention further pertains to new and improved constructions of apparatus for the performance of the aforementioned method aspects.

For the automatic regulation of the bath level of continuous casting molds, especially continuous casting installations for steel, there have become known to the art different methods which have been employed in practical applications. Measuring the bath level by means of radioactive devices, thermoelements, optical devices and so forth have found widespread use in this technology.

Publications concerned with the continuous casting art have also proposed measuring the change in the bath level of the continuous casting mold by means of electromagnetic alternating fields. According to specific proposals in this respect one or a number of coils are arranged externally of the cooling jacket at the region of the bath level or over the entire length of the mold about the mold walls and generate an electromagnetic alternating field. The liquid casting metal functions as a movable coil core and as the bath level changes produces changes in the electromagnetic alternating field. At one or a number of receiver coils these changes of the inductance are measured as a function of the bath level and employed as an input signal for regulation of the bath level. These proposed apparatuses are associated with the drawback that the input signal is appreciably affected to a greater degree owing to continuously changing disturbing influences than by the changes in the level of the molten bath in the continuous casting mold. With changes in the bath level of, for instance, 1 centimeter, with a measuring system having coils arranged about the mold, there were measured as characteristic values less than 0.1 percent change in relation to the output inductance. Such small differences in the measured value as the input signal for a control produce inaccurate output signals for the regulation of the inflowing molten metal. Moreover, temperature differences at the copper wall and in the supporting frame cause changes in the mutual inductance between the coils in the order of magnitude of about one percent. These disturbing influences due to superimposing phenomena attenuate and falsify the measuring results to such a degree that they are no longer suitable for accomplishing an exact regulation of the molten bath level. It is for these reasons that such measuring technique has not found any practical application in the continuous casting art up to the present time.

SUMMARY OF THE INVENTION

Therefore, with the foregoing in mind it is a primary object of the present invention to provide an improved method of, and apparatus for, regulating the bath level of a continuous casting mold by means of electromagnetic alternating fields in a manner not associated with the aforementioned drawbacks and limitations of the prior art proposals.

Still a further significant object of the present invention is directed to a new and improved method of, and apparatus for, regulating the bath level of a continuous casting mold wherein the aforementioned disturbing influences during the measurement of the bath level in the continuous casting mold by means of electromagnetic alternating fields are essentially suppressed or eliminated.

Yet a further significant object of the present invention concerns devising a new and improved method, and apparatus for, regulating the casting mold level of a continuous casting installation in an extremely accurate, reliable and efficient manner, while eliminating spurious effects tending to falsify the measuring signals employed for bath level regulation.

Now in order to implement these and still further objects of the invention, which will become more readily apparent as the description proceeds, the method aspects of the invention for regulating the bath level of a continuous casting mold contemplates directing an electromagnetic primary alternating field at a mold wall at the pour side of the continuous casting mold where there is infed the molten metal, inducing a current in the mold wall by means of the alternating field, then measuring a secondary electromagnetic alternating field generated by such current and employing such secondary electromagnetic alternating field as an input signal for regulation of the bath level.

The inventive method employs for the first time as a parameter the measurement of the height of the wall above the bath level, there being measured this free height in the hollow mold compartment by the secondary electromagnetic alternating field produced in such wall. In contrast to measuring techniques employing magnetic alternating fields according to the state-of-the-art there results the advantage that the part of the input signal which is influenced by the height of the wall above the bath level is easily separable by a gating circuit from the disturbing or spurious part of the input signal and can be employed as the measured or measurement value. The known disturbance factors, such as temperature differences in the mold wall and the electrical resistance in the copper wall and in the supporting frames formed of steel which are dependent thereon, remain relatively constant above the bath level and thus do not introduce practically any negative effect upon the measurement result. It has been found that the measurement result, according to the inventive method, has at least the same great degree of accuracy as the results obtained when using radioactive sources which have been accepted and found to be useful in practice for prior art bath level-measuring devices. All of the drawbacks and dangers which are prevalent when working with radioactive materials however are no longer existent when employing the novel method of the present invention.

As already alluded to above the invention is not only concerned with the aforementioned method aspects, but also relates to a new and improved construction of apparatus wherein the transmitter coil is arranged above the region of the bath level and the generated direction of the lines of force of the transmitter coil are directed at a mold wall and the receiver coil is arranged in the induction field of the secondary electromagnetic alternating field. It can be particularly advantageous if the primary alternating field is directed at a side of the mold wall which confronts the hollow mold compartment.

By selecting the frequency of the electromagnetic alternating field it is possible to eliminate, on the one hand, the spurious or disturbing influences of already existing alternating fields emanating from motors, magnets and so forth, and, on the other hand, to influence the penetration depth of the induction in the copper wall of the mold as well as the phase shift between the primary alternating field and the secondary alternating field. The invention further proposes during measurement of the secondary alternating field to employ at an outer boundary surface of a cooling water gap of the mold wall at the region of the bath level an electromagnetic alternating field of 30 Hz to 500 Hz. The receiver coil is arranged at this outer boundary surface of the cooling water gap of the mold wall at the region of the bath level. This technique and the corresponding arrangement of the receiver coil is used, as a general rule, in conjunction with tube or tubular molds.

A particular advantageous signal for controlling the bath level regulation can be obtained if the secondary alternating field is measured below the height of the reference bath level. The receiver coil, for this measuring technique, is arranged below the height of the reference bath level at the outer boundary surface of the cooling water gap associated with the mold wall. There can be advantageously measured the amplitude and phase angle of the secondary alternating field and the amplitude linked with the phase angle can be used as the input signal. Due to this linking there can be produced an electrical control signal which is almost proportional to the bath level.

With regard to the coil arrangement it can be advantageous if the primary alternating field is directed at the end of the mold wall arranged transversely with respect to the lengthwise axis of the continuously cast strand. The windings of the transmitter coil and selectively also the receiver coil are located in planes arranged transversely with repect to the lengthwise axis of the continuously cast strand or casting. Cooling and insulation are facilitated due to this coil arrangement.

Penetration of the secondary electromagnetic alternating field, decisive for the measurement, through the copper wall is not necessary if the transmitter coil and the receiver coil are mounted above the region of the bath level and directed towards the hollow mold compartment or cavity. According to one particular feature of the invention it is, however, of advantage to arrange the transmitter coil and the receiver coil in the same horizontal plane, and thus, to mount both coils at the same distance from the bath level. This extremely simple geometric arrangement also is available in the case of molds for casting larger strand sectional shapes or formats, such as for instance for plate molds used for casting slab sections. The coils can have the same alignment or direction with regard to the copper wall arranged therebelow. It has been found to be particularly advantageous when measuring the secondary alternating field to employ at the pour-side boundary surface of the mold wall an electromagnetic alternating field of preferably about 1000 Hz. As a result, the penetration depth of the alternating field into the copper wall assumes a small value, so that there is achieved an additional improvement in the input signal.

Possible noise levels can be avoided if the transmitter coil and the receiver coil are arranged in spaced relationship from one another at the pour-side or infeed side of the boundary surface of a mold wall and insulated from one another. It has been found to be advantageous if the central axis of both coils extend essentially in parallelism to one another and the spacing of such axes is in the order of about between 250 millimeters and 350 millimeters. The distance of the coils to the copper wall above the bath level is thus minimum, so that disturbing influences are suppressed and there is obtained high measurement accuracy of the bath level.

To reduce the disturbing or spurious effects it is of particular interest to eliminate all undefined electrical contacts at the neighborhood of the coils. The metallic parts at the neighborhood of the coils are advantageously either welded or when using screw or thread connections mutually insulated. Therefore, the invention further proposes mounting both coils in a respective sheet metal housing formed of non-magnetic steel and to insulate the coils in relation to such sheet metal housings as well as the latter in relation to the attachment locations.

The upwardly directed lines of force of the coils can be advantageously rendered innocuous if the mold cover plate over the coils is formed of magnetic iron. Additionally, this cover plate protects the coils from extraneous magnetic fields and thus assists in diminishing disadvantageous spurious or disturbance fields.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 5 is a plan view of a tubular mold employing the principles of the invention;

FIG. 6 is an enlarged sectional view of the mold arrangement of FIG. 5, taken substantially along the line VI—VI thereof;

FIG. 7 is a vertical sectional view of a partially illustrated tubular mold utilizing the teachings of the invention;

FIG. 8 are graphs showing the phase angle and amplitude of the input signal as a function of the bath level;

FIG. 9 is a graph showing the corrected input signal; and

FIG. 10 is a vertical sectional view of a partially illustrated plate mold employing the teachings of the invention.

DETAILED DESCRIPTION OF THE PREFERRED EMBODIMENTS

Figure 1:
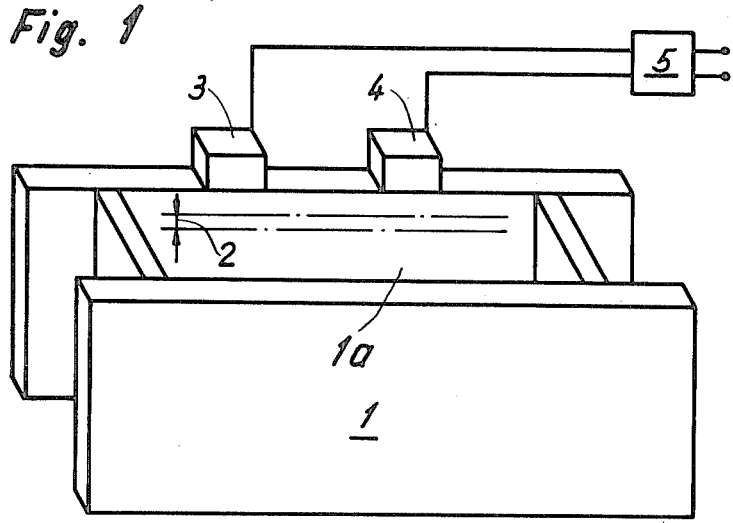
FIG. 1 is a perspective view of a schematically illustrated continuous casting mold in the form of a plate mold equipped with apparatus designed according to the teachings of the present invention.

Describing now the drawings, it is to be understood that for purposes of simplifying the illustration only enough of the structure of the continuous casting installation or plant has been shown in the drawings to enable those skilled in the art to readily understand and appreciate the underlying principles and concepts of the invention. Turning attention therefore to FIG. 1 it will be seen that a transmitter coil 3 and a receiver coil 4 are arranged above a reference bath level region 2 of a continuous casting mold 1, here shown as a plate mold, at the pourside i.e., the side where there is infed the molten metal, in order to measure the bath level. These coils 3 and 4 are connected in circuit with a control 5 of the bath level measuring device. This control or control means 5 is operatively connected in conventional fashion with not particularly illustrated known control elements for the metal inflow to the mold and/or for the withdrawal device which regulates the withdrawal speed of the cast strand.

Figure 2:
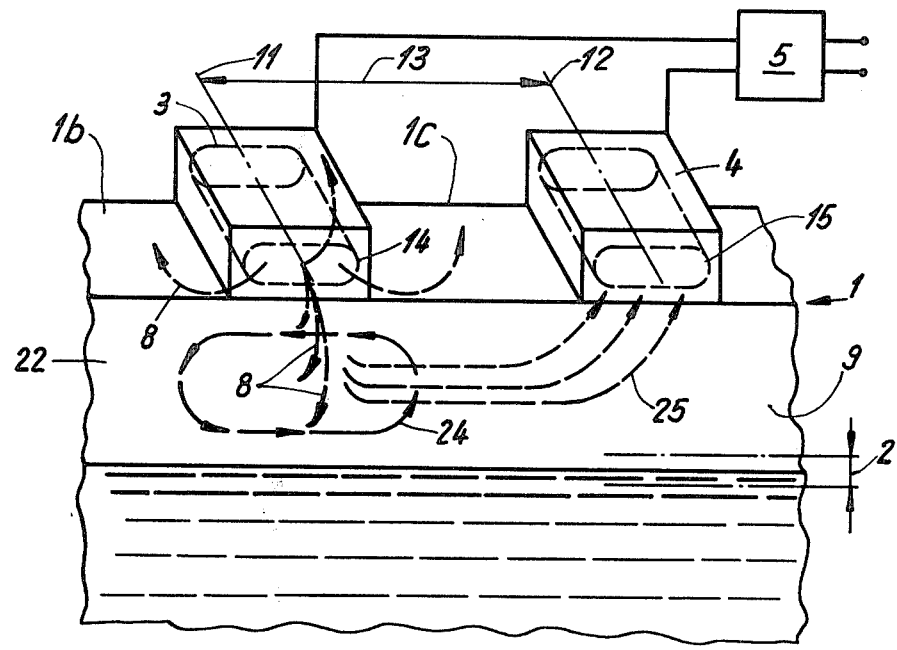
FIG. 2 is an enlarged fragmentary sectional view of the arrangement of FIG. 1.

In FIG. 2 there is shown the geometric arrangement of the transmitter coil 3 and the receiver coil 4 and the course of the lines of force 8 produced by the transmitter coil 3. The course of such lines of force 8 is directed at a side 9 of a mold wall 22 and which side confronts the hollow mold compartment or cavity, generally designated by reference character 1a in FIG. 1. In the embodiment under discussion both of the coils 3 and 4 are arranged in the same horizontal plane at the pourside boundary surface 1b of a copper plate 1c of the wide side of the plate mold 1 and in spaced relationship from one another. The central axes 11 and 12 of the coils 3 and 4, respectively, extend essentially in parallelism to one another and the spacing 13 between these coil axes 11 and 12, in the case of plate molds for slab sections, amounts to for instance 250 to 350 millimeters. It is also conceivable, for instance when working with narrow molds, to arrange the transmitter coil and receiver coil at oppositely situated mold walls. The windings 14 and 15 of the coils 3 and 4 are located approximately parallel to the side 9 of the mold wall 22. The significance of reference characters 24 and 25 will be explained hereinafter in conjunction with details of the method aspects.

Figure 3:
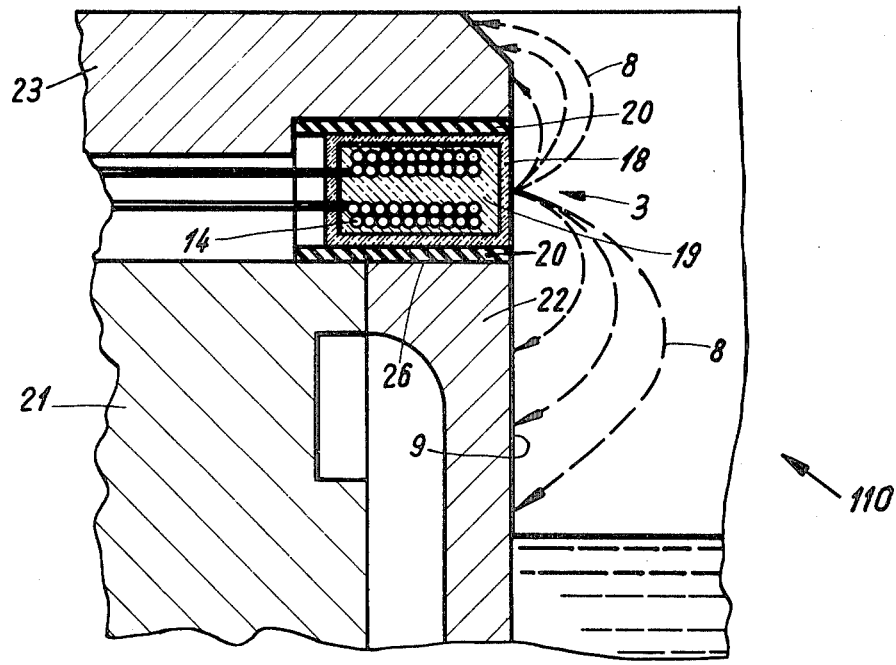
FIG. 3 is a vertical sectional view through a partially illustrated plate mold having incorporated therein apparatus constructed according to the invention.

FIG. 3 illustrates the installation of the transmitter coil 3 at a plate mold, generally designated by reference character 110, and composed of the usual mold walls including the shown mold wall 22 formed of copper and the steel frame 21. Since the mounting of the receiver coil 4 is basically like that for the transmitter coil 3, the same has not been particularly shown and it will suffice to consider in detail the arrangement of the coil 3. The windings 14 of the coil 3 are embedded in a heat-resistant insulation 19 within a sheet metal housing 18 formed of non-magnetic steel or other suitable non-magnetic material. Furthermore, insulation 20 is provided between the sheet metal housing 18 and the pour-side boundary surface 26 of the mold wall 22 and there also is arranged a mold cover plate 23 over the coil and the insulation 20, as shown. This mold cover plate 23 which is arranged over the coils 3 and 4 advantageously is formed of magnetic iron or steel.

Figure 4:
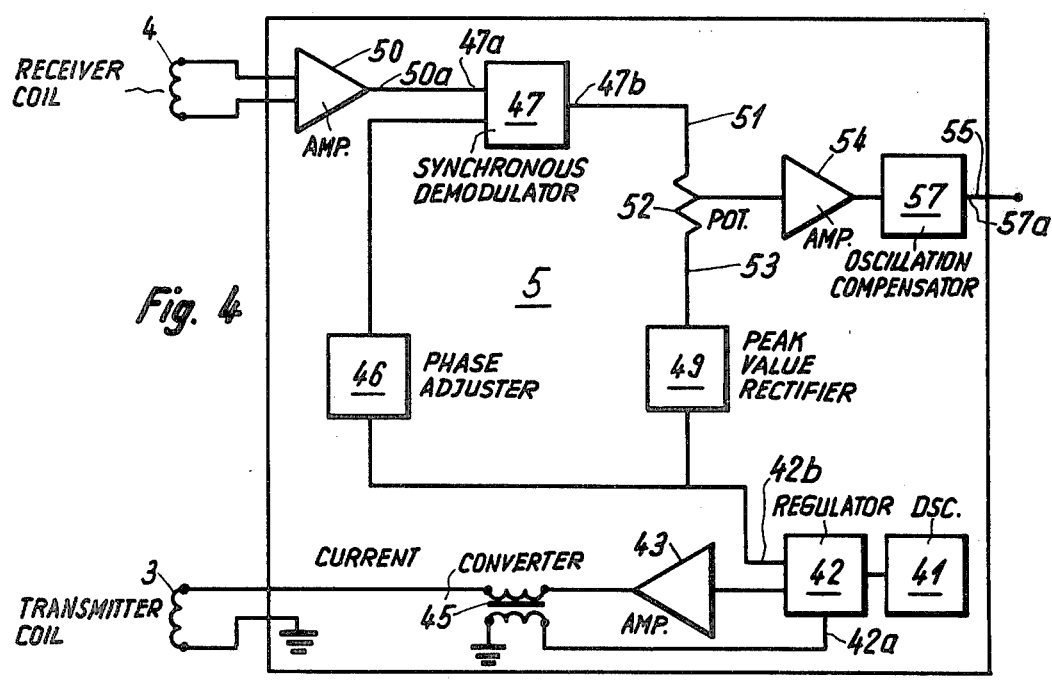
FIG. 4 is a block circuit diagram of the control of the inventive apparatus.

With reference to FIG. 4 there will be explained on the basis of a simplified block circuit diagram the mode of operation of the control or control means 5 of the inventive apparatus. A crystal-controlled oscillator 41 produces an alternating-current of 1000 Hz which is delivered by means of a regulating circuit or regulator 42 to an amplifier 43. The transmitter coil 3 carries a current of about 2 amperes. The amplitude of this alternating-current is maintained constant by means of the regulation circuit or regulator 42. The alternating-current of the transmitter coil 3 is monitored by a current converter or transformer 45, which, in turn, delivers a control signal as an input signal to the input 42a of the regulator 42. The output alternating-current, appearing at the regulator output 42b of the regulator or control circuit 42 is also delivered by means of a phase adjustment or matching device 46 to a synchronous demodulator 47.

The input signal of the receiver coil 4, after passing through an amplifier 50, likewise is delivered from the amplifier output 50a to the input 47a of the synchronous demodulator 47. This synchronous demodulator 47 delivers at its output 47b an output signal 51 which is essentially proportional to the amplitude of the received signal at the receiver coil 4. The output signal 51 is subsequently delivered to a potentiometer 52 which also receives the output alternating-current signal 53 of the regulation circuit 42 which is infed by means of the peak value-rectifier 49 to such potentiometer 52. The difference between the current of the signal 51 and the current of the signal 53 is delivered to an amplifier 54. This amplifier 54 amplifies such difference signal and such amplified signal 55, appearing at the output of 57a of the oscillation compensator 57—to be discussed more fully hereinafter—corresponds to the actual value of the filling state of the mold. This actual value-signal 55 appearing at the compensator output 57a can be infed, as previously explained, to any suitable filling level regulation or control system, such as a filling level control for the stopper or slide control at the tundish and/or the control of the drive assembly or strand withdrawal unit of the continuous casting installation, as is well known in the art.

In order to compensate for the relative movement between the bath level and the mold wall which is produced by mold oscillation it is possible to equip the control 5 with the previously mentioned electrical oscillation compensator 57. However, it is also possible to eliminate the disturbing, generally sinusoidal oscillations of the input signal by selecting an appropriate time-constant.

The mode of operation of the inventive method will now be considered and explained in conjunction with FIG. 2. At the pour-side i.e. metal infeed side of the mold 1 an electromagnetic alternating field is directed by means of the transmitter coil 3 at the side 9 of the mold wall 22 which confronts the hollow mold compartment 1a. This alternating field having the schematically indicated lines of force 8, induces a current which flows in the mold wall 22. The mold wall 22 in effect constitutes a coil having a single winding, as schematically represented by the arrow 24. The current induced in the mold wall 22 formed of copper produces, in turn, a secondary electromagnetic alternating field, generally represented by the arrows 25. This secondary alternating field 25 generates at the receiver coil 4 a voltage which is infed as an input signal to the control 5 of the bath level-measuring device. The alternating-current which is delivered to the transmitter coil 3 has, for instance, a frequency of 1000 Hz. At the receiver coil 4 there is also received part of the primary magnetic field of the transmitter coil 3 as a base value. This base value however does not negatively influence the received value of the electromagnetic secondary field at the receiver coil 4 which is dependent upon the bath level and emanating from the mold wall 22 above the bath level.

Now in FIGS. 5 and 6 there is shown an arrangement wherein a transmitter coil 3' is dispositioned, essentially in the same manner as for the plate mold 1 of FIG. 1, at the pour-side-boundary surface of a copper wall 59 of a tubular mold 60. A receiver coil 4' is mounted at an outer boundary surface 61 of the cooling water gap 62 at the region of the bath level and is threadably connected in a recess 64a of the wall 64 bounding the cooling water gap 62. The windings 4a of the coil 4' are embedded in a rust-proof non-magnetic sheet metal housing 18' within insulation 19'. Between the sheet metal housing 18' and the wall 64 there is arranged a further not particularly shown insulation layer, merely schematically represented by reference character 64b. The windings 4a of the receiver coil 4' are located in a plane which is essentially parallel to the side 65 of the mold wall 59 formed of copper, which as a general rule for tubular molds has a thickness in the order of about 8 to 15 millimeters. Reference character 70 represents a support frame for the mold 60 while reference character 71 indicates a mold cover or cover plate formed of steel by way of example.

The frequency of an electromagnetic field 8' of the transmitter coil 3', with the arrangement of the receiver coil 4' behind the mold wall 59 formed of copper, is somewhat lower than with the arrangement shown in FIG. 1. It can be selected to be in the order of about for instance 30 Hz and 500 Hz. There are preferably utilized frequencies between 100 Hz and 300 Hz. The magnetic field 8' produces in the copper wall a current which, as a function of the bath level 67, generates a secondary magnetic field which, in turn, induces a voltage in the receiver coil 4'. At the synchronous demodulator 47 (FIG. 4) of the control or control means 5 there is separated by means of gating circuit the spurious or disturbance part of the voltage of the input signal and the part of the signal which is dependent upon the bath level is used for controlling the bath level-control device.

In order to achieve a large measuring range in the direction of travel 68 of the strand the length of the receiver coil 4' amounts to, for instance, about 200 millimeters. The coil 4' is elevationally dispositioned such that its central axis coincides with the reference bath level of the mold. The coil width as a rule is chosen to be somewhat smaller than the side length of the strand cross-section. In the case of molds for strands having circular sections, octagonal sections and so forth, the receiver coil 4' can be accommodated to the boundary surface 61 of the cooling water gap 62 and arranged parallel to the side 65 of the hollow mold compartment, generally indicated by reference character 65a in FIG. 6.

Now in order to be able to exactly monitor at the start of the pour the bath level rising in the mold and in front of the region of the reference bath level, it is possible to combine with the inventive method additionally bath level-measuring devices which monitor the rising bath level over the entire mold height and which can be used for the automatic control of the start of strand withdrawal. As additional bath level-measuring devices there can be employed, for instance thermoelements or equivalent structure arranged at different levels in the mold wall.

Due to the arrangement of the transmitter coils 3 or 3' and the receiver coil 4 above the region of the bath level these coils are exposed to the thermal radiation of the casting jet and the molten bath level. In the case of disturbances, such as mold overflow, these coils are subjected to additional high thermal loads. Therefore, it is advantageous if at least the coil sides located parallel to the coil supporting-mold wall are cooled with water.

The coils can also be installed however at or in a water-cooled mold wall formed of copper or a water-cooled mold cover plate.

In order to reduce or compensate for the thermal effects in the coils 3 and 4 and the current-flow resistance or volume resistivity for magnetic lines of force through the coil housings with changing temperature, it is advantageous to fabricate the coil housings or at least parts thereof from stainless steel sheeting or plating of for instance 1.6 millimeters thickness and copper plating or sheeting of about 0.2 millimeters thickness.

FIG. 7 illustrates the arrangement of the receiver coil 4" below a reference bath level 81 in a partially illustrated mold 82. The other parts of this mold 82 are constructed like in the arrangement of FIG. 6.

The measurement results of such arrangement of the transmitter coil 3' and the receiver coil 4" can be best recognized by referring to FIG. 8. At the left side of the showing of FIG. 8 there is illustrated along the ordinate 85 the bath level and along the abscissa 86 the measured phase angle of the sinusoidal secondary alternating field as a function of the bath level. It will be seen from the curve 87 that the phase angle of the input signal (250 Hz) with the bath level 89 and lower amounts to for instance 270° and for the bath level 90 and greater bath levels amounts to about 90°. The amplitude of the alternating field is illustrated at the right side of the graph along the abscissa 92. The plotted curve 93 shows the measured amplitude value as a function of the bath level. At the region between the bath levels 89 and 90 the curve shows an amplitude of almost null. From this amplitude curve 93 there can be recognized that two different secondary magnetic fields can be measured as a function of the bath level and through appropriate compounding or linking and evaluation of the amplitude curve 93 by means of the phase angle curve 87 there can be derived an input signal curve 95 as shown in the graph of FIG. 9. Now in the graph of FIG. 9 there is plotted along the ordinate 96 again the bath level and along the abscissa 97 the corrected amplitude of the alternating field of the input signal. This curve 95 is only slightly arched or bent, so that it will be seen that the input signal is almost proportional to the bath level.

The reference bath level can be set, for instance, between the bath levels 89 and 90. It is also possible to arrange a number of receiver coils at different elevations, in order for instance to fix a number of reference bath levels in a mold or to obtain a larger measuring range. It is selectively possible to further improve through the use of a number of receiver coils the received signal characteristic.

Finally, in FIG. 10 there is shown a further example wherein the transmitter coil 100 is arranged such that the windings 101 of such transmitter coil 100 are located in planes 103 dispositioned transversely with respect to the lengthwise axis 102 of the cast strand or the like. With this arrangement it is possible to direct the primary alternating field at the end face or side 105 of the mold wall 104 which is arranged transversely with respect to the strand lengthwise axis 102. It is also selectively possible to arrange the receiver coil 4 at the end face 105 in the same position as the transmitter coil 100.

While there are shown and described present preferred embodiments of the invention, it is to be distinctly understood that the invention is not limited thereto, but may be otherwise variously embodied and practiced within the scope of the following claims.

Accordingly, what we claim is:

1. A method of regulating the bath level of a continuous casting mold by means of electromagnetic alternating fields, comprising the steps of:
- using a continuous casting mold having a hollow mold compartment and a pour-side where there is infed molten metal to be cast for forming therein a cast strand moving in a predetermined direction of travel;
- forming an electromagnetic primary alternating field at the pour-side of the mold and which is directed into the hollow mold compartment by means of a transmitter coil having a central axis extending transversely with respect to the direction of travel of the cast strand;
- inducing by means of the electromagnetic primary alternating field a current which flows in the mold wall;
- generating a secondary electromagnetic alternating field by means of said current;
- measuring the secondary electromagnetic alternating field emanating above the bath level out of the mold wall by means of a receiver coil whose central axis is located in spaced relation from the central axis of the transmitter coil; and
- utilizing the secondary electromagnetic alternating field as an input signal for regulating the bath level.

2. The method as defined in claim 1, further including the steps of:
- utilizing a continuous casting mold having an outer boundary surface of a cooling water gap of the mold wall; and
- measuring the secondary alternating field at said outer boundary surface of the cooling water gap of the mold wall.

3. The method as defined in claim 2, further including the step of:
- utilizing a primary alternating field having a frequency in the order of approximately 30 to 500 Hz.

4. The method as defined in claim 1, further including the step of:
- measuring the secondary alternating field below a reference bath level of the continuous casting mold.

5. The method as defined in claim 4, further including the steps of:
- measuring the amplitude and phase angle of the secondary alternating field; and
- utilizing the amplitude combined with the phase angle as the input signal.

6. The method as defined in claim 1, further including the steps of:
- utilizing as the continuous casting mold a mold having a boundary surface at the pour side of the continuous casting mold; and
- employing an electromagnetic alternating field as said primary alternating field which has a predetermined frequency when measuring the secondary alternating field at the pour side-boundary surface of the continuous casting mold.

7. The method as defined in claim 6, wherein:
- said frequency of the electromagnetic alternating field amounts to about 1000 Hz.

8. An apparatus for regulating the bath level of a continuous casting mold by means of electromagnetic alternating fields, comprising:
- a continuous casting mold having a hollow mold compartment bounded by mold walls and a pour-side for the infeed of molten metal to be cast therein so as to form a continuously cast strand moving in a predetermined direction of travel;
- a transmitter coil arranged at the pour-side and above the region of the bath level of the continuous casting mold for measuring the bath level;
- a receiver coil arranged at the continuous casting mold;
- said transmitter coil producing an electromagnetic primary alternating field having a course of its generated lines of force directed at a mold wall;
- said primary alternating field inducing a secondary electromagnetic alternating field in said mold wall;
- said receiver coil being arranged in the induction field of the secondary electromagnetic alternating field;
- said transmitter coil having its central axis arranged transversely with respect to the direction of travel of the strand;
- the course of the lines of force produced by said transmitter coil being located at a side of the mold wall which confronts the hollow mold compartment;
- the central axis of the receiver coil being located in spaced relationship with respect to the central axis of the transmitter coil; and
- control means connected to the receiver coil, said control means adapted to utilize the secondary electromagnetic alternating field as an input signal for regulating the bath level.

9. The apparatus as defined in claim 8, wherein:
- said transmitter coil and said receiver coil are arranged essentially in the same horizontal plane.

10. The apparatus as defined in claim 8, wherein:
- said receiver coil is arranged at the region of the bath level at an outer boundary surface of a cooling water gap associated with the mold wall.

11. The apparatus as defined in claim 8, wherein:
- said receiver coil is arranged below the bath level at an outer boundary surface of a cooling water gap associated with the mold wall.

12. The apparatus as defined in claim 8, wherein:
- the transmitter coil and the receiver coil are arranged at the pour-side boundary surface of the mold wall;
- means for insulating the transmitter coil and receiver coil with respect to the boundary surface of the mold wall.

13. The apparatus as defined in claim 12, wherein:
- each of said coils has a central axis extending essentially in parallelism with respect to one another; and
- the spacing between said axes amounts to about 200 to 300 millimeters.

14. The apparatus as defined in claim 8, wherein:
- each of the coils is arranged in a housing formed of non-magnetic steel; and
- insulating means for insulating the coils with respect to said housings and attachment locations for said housings.

15. The apparatus as defined in claim 14, further including:
- a mold cover plate formed of magnetic iron and arranged above the coils.